United States Patent
Skalitzky et al.

(10) Patent No.: US 11,088,530 B2
(45) Date of Patent: Aug. 10, 2021

(54) HIGHLY VARIABLE AND ADJUSTABLE CURRENT CIRCUIT BREAKER

(71) Applicant: The Government of the United States of America, as represented by the Secretary of the Navy, Arlington, VA (US)

(72) Inventors: Robert G. Skalitzky, Washington, DC (US); Tuan A. Duong, Washington, DC (US); John Gambert, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 433 days.

(21) Appl. No.: 15/954,954

(22) Filed: Apr. 17, 2018

(65) Prior Publication Data

US 2018/0301888 A1    Oct. 18, 2018

Related U.S. Application Data

(60) Provisional application No. 62/486,825, filed on Apr. 18, 2017.

(51) Int. Cl.
*H02H 3/027* (2006.01)
*H02H 1/00* (2006.01)
*H02H 3/00* (2006.01)

(52) U.S. Cl.
CPC .......... *H02H 3/027* (2013.01); *H02H 1/0007* (2013.01); *H02H 1/0092* (2013.01); *H02H 3/00* (2013.01)

(58) Field of Classification Search
CPC ........ H02H 1/0092; H02H 3/00; H02H 3/027; H02H 1/0007; H02H 3/006; H02H 3/0935;

(Continued)

(56) References Cited

U.S. PATENT DOCUMENTS

| 7,149,098 B1 * | 12/2006 | Chen | H02M 1/32 363/56.09 |
| 2013/0242445 A1 * | 9/2013 | Dani | H02H 3/207 361/86 |

(Continued)

*Primary Examiner* — Alex Torres-Rivera
(74) *Attorney, Agent, or Firm* — US Naval Research Laboratory; Richard Bis

(57) ABSTRACT

A circuit breaker includes a monitor to detect a performance of an electrical load in an electrical circuit, a converter to create a digital signal based on the detected performance of the electrical load, and a digital integrated circuit to compare the digital signal with a predetermined threshold reference signal, and generate a command signal to electrically disconnect the electrical load from the electrical circuit when a level of the digital signal exceeds the predetermined threshold reference signal. The electrical load may be configured to receive a fixed or variable amount of current or voltage. The predetermined threshold reference signal may include a signal level threshold and a time threshold. The digital integrated circuit may generate the command signal when the level of the digital signal exceeds the signal level threshold and the detected performance of the electrical load exceeds the time threshold.

12 Claims, 15 Drawing Sheets

(58) Field of Classification Search
CPC .......... H02H 3/08; H02H 3/087; H02H 3/093; H02H 3/10; H02H 3/12; H02H 3/20; H02H 3/202; H02H 3/205; H02H 3/207; H02H 3/24; H02H 3/243; H02H 3/247
See application file for complete search history.

(56) References Cited

U.S. PATENT DOCUMENTS

| | | | |
|---|---|---|---|
| 2015/0270697 A1* | 9/2015 | Satheesh | H02H 3/05 361/102 |
| 2016/0139644 A1* | 5/2016 | Dawley | G06F 1/30 713/300 |
| 2017/0250043 A1* | 8/2017 | Hurwitz | H02H 3/04 |
| 2019/0165561 A1* | 5/2019 | Sawano | H02H 3/0935 |

* cited by examiner

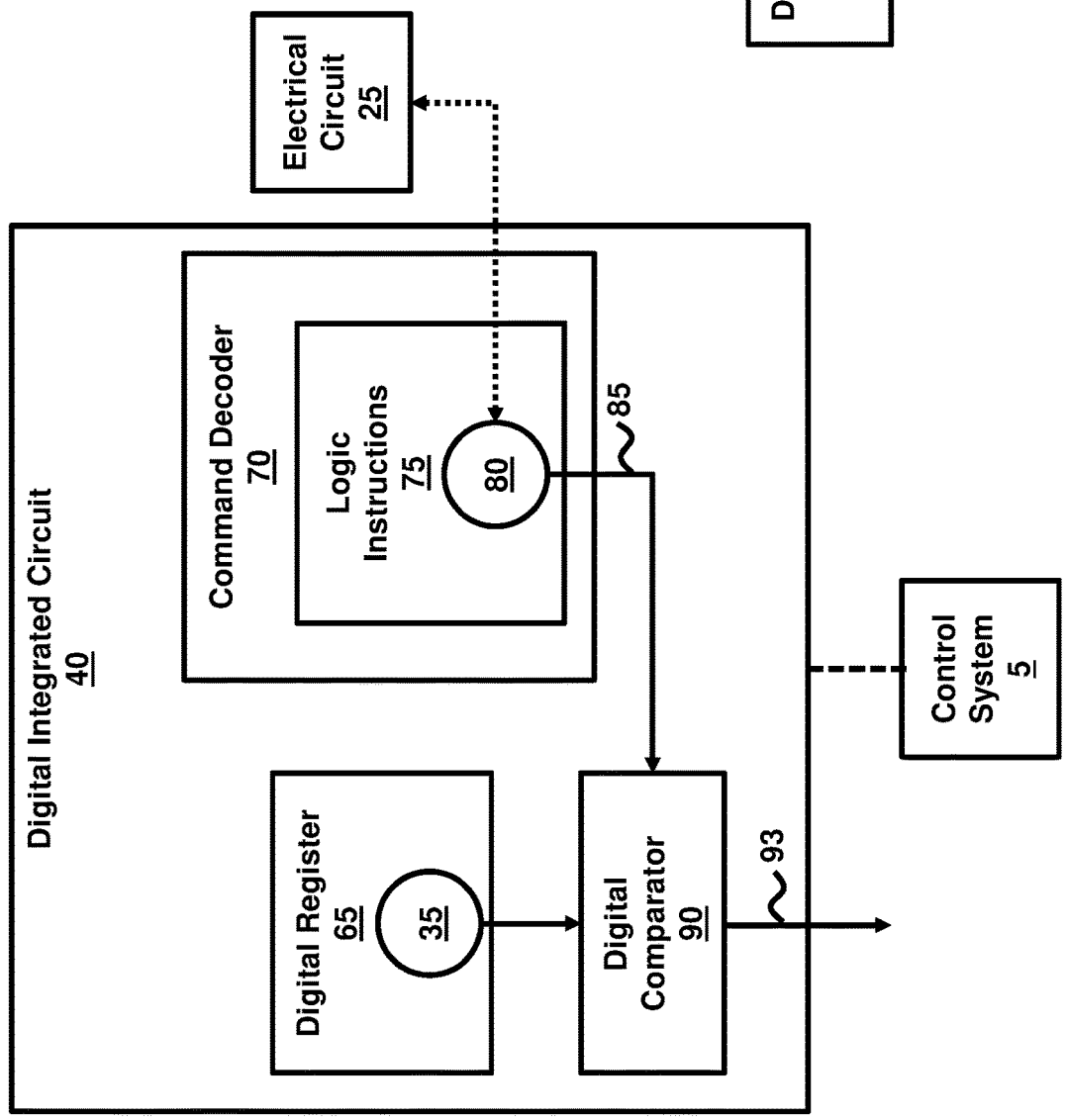

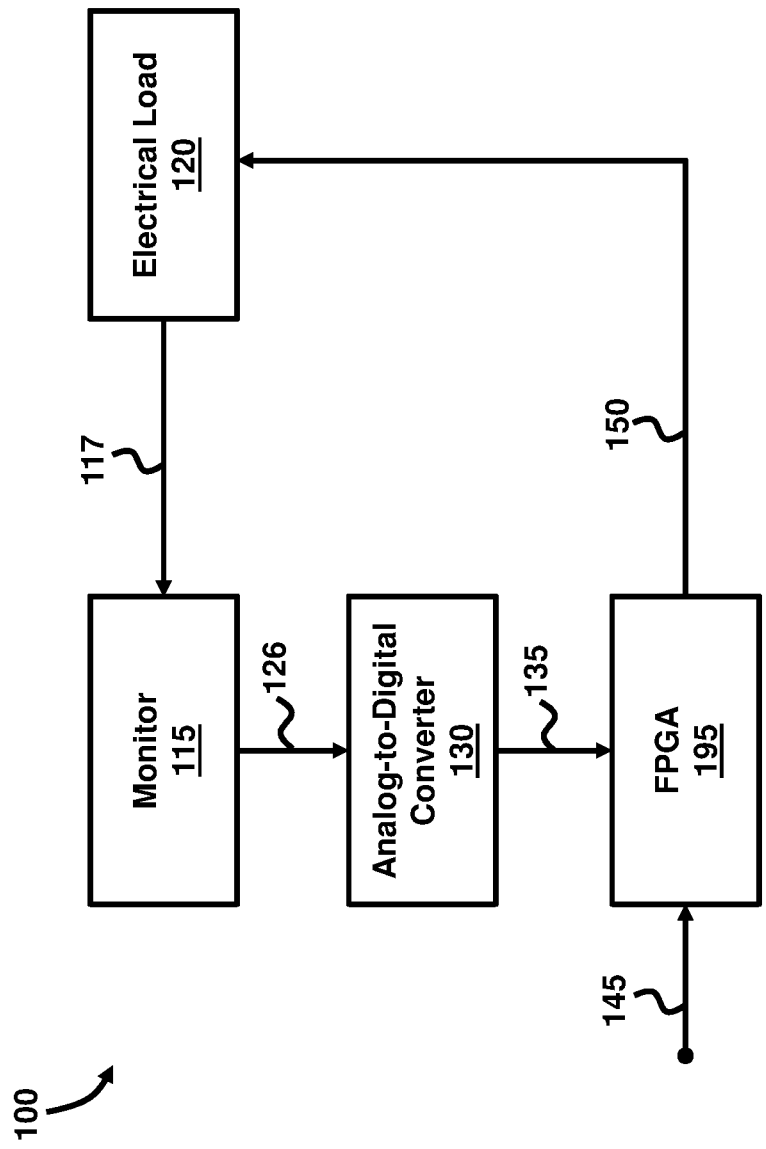

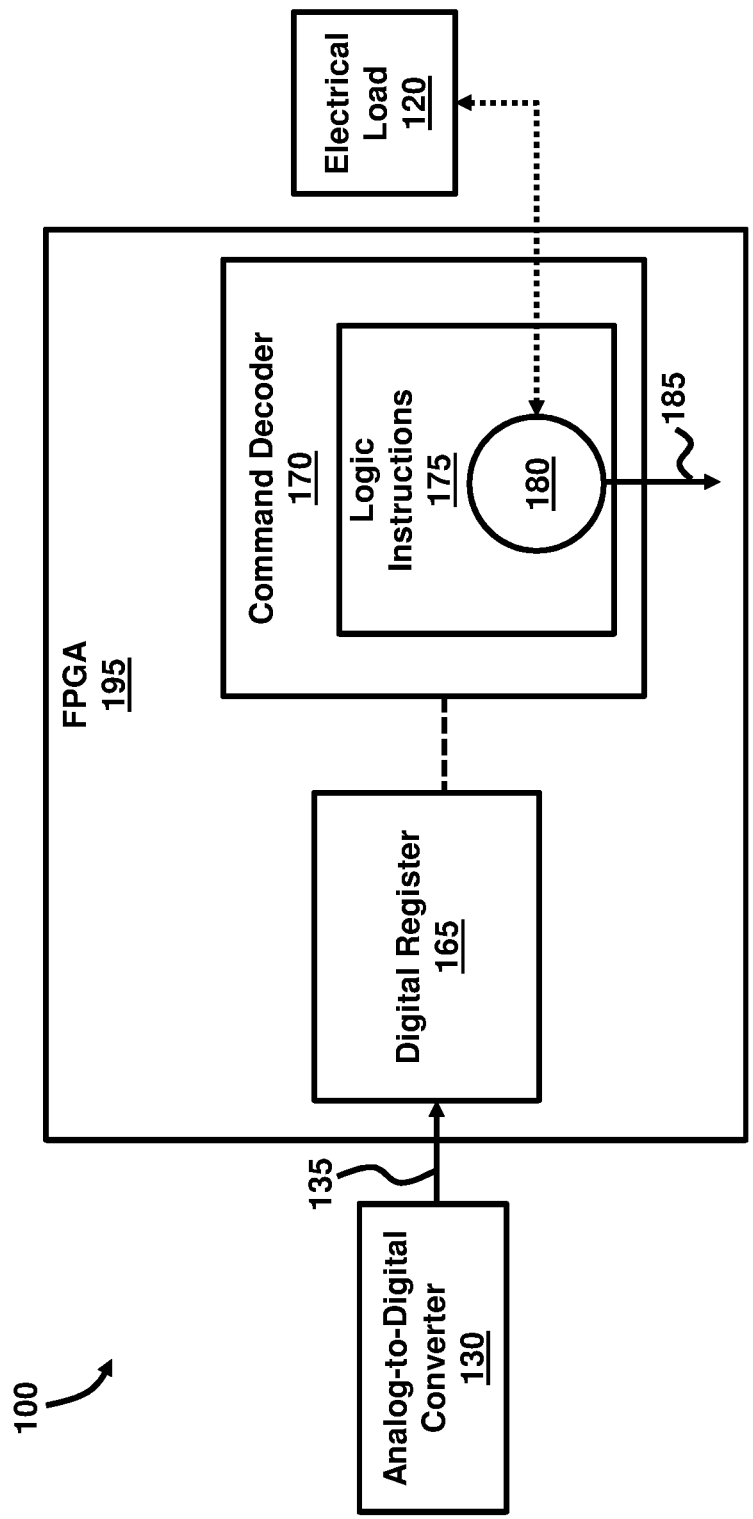

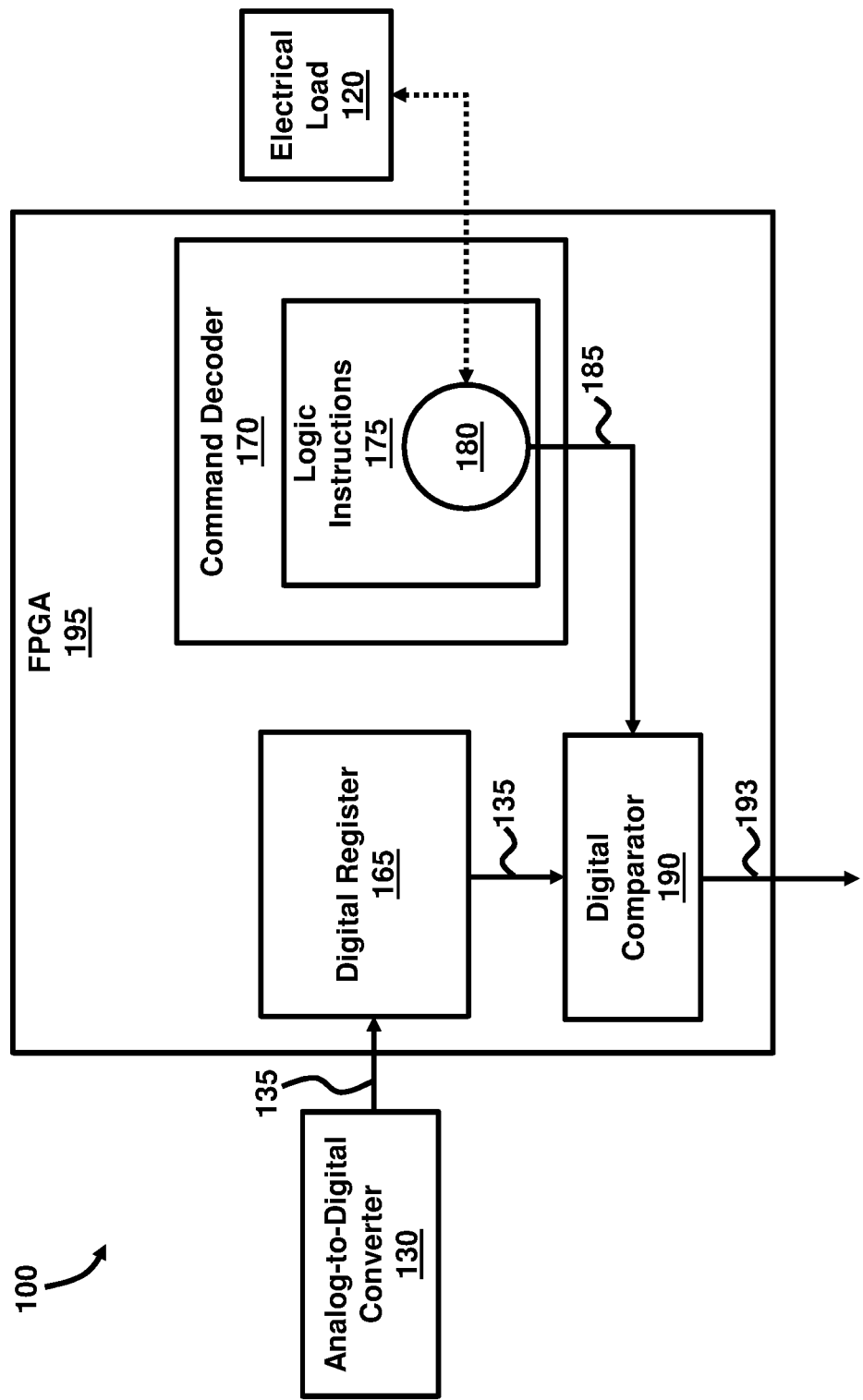

HIGHLY VARIABLE AND ADJUSTABLE CURRENT CIRCUIT BREAKER

CROSS REFERENCE TO RELATED APPLICATION

This application claims the benefit of U.S. Provisional Patent Application No. 62/486,825 filed on Apr. 18, 2017, the contents of which, in its entirety, is herein incorporated by reference.

GOVERNMENT INTEREST

The embodiments herein may be manufactured, used, and/or licensed by or for the United States Government without the payment of royalties thereon.

BACKGROUND

Technical Field

The embodiments herein generally relate to electrical devices, and more particularly to circuit breakers for protecting electrical loads in an electrical circuit.

Description of the Related Art

Modern spacecraft power system distribution systems can be damaged by malfunctioning electronics systems. Unfortunately, most electrical loads produce high currents normally during a turn-on phase, which act like an electrical failure but, in actuality, are not. Fuses are relatively inexpensive means of protection, but these devices often fail prematurely or have sizing problems. Circuit breakers can be used to protect a power source against damage from electrical loads being powered from the power source. The circuit breaker is used to protect the power source, wire, power switches, etc. from damage. The use of resettable circuit breakers as a protection method is an established means of providing protection in lieu of fuses, but conventional circuit breakers tend to be limited by design, selection options, performance, and implementation issues. Moreover, the circuit breaker is often limited by the implementation of the controlling logic, which defines how well the circuit breaker performs its job.

Standard circuit breakers are typically designed for a single current rating, which is not adjustable or variable. If a different value/rating is required, a new circuit breaker has to be created/used. As such, the conventional circuit breakers typically cannot be altered, adjusted, modified, or improved once the configuration has been established. Additionally, the conventional circuit breakers are generally formed of discrete analog circuits.

SUMMARY

In view of the foregoing, an embodiment herein provides a circuit breaker comprising a monitor to detect a performance of an electrical load in an electrical circuit; a converter to create a digital signal based on the detected performance of the electrical load; and a digital integrated circuit to compare the digital signal with a predetermined threshold reference signal, and generate a command signal to electrically disconnect the electrical load from the electrical circuit when a level of the digital signal exceeds the predetermined threshold reference signal. The electrical load may be configured to receive a fixed or variable amount of current or voltage. The predetermined threshold reference signal may comprise a signal level threshold and a time threshold. The digital integrated circuit may generate the command signal when the level of the digital signal exceeds the signal level threshold and the detected performance of the electrical load exceeds the time threshold. The digital integrated circuit may comprise a digital register to store the digital signal; a command decoder comprising logic instructions to set a threshold performance level for the electrical circuit, and generate an adjustable threshold reference signal based on the threshold performance level; and a digital comparator to compare the digital signal from the digital register with the adjustable threshold reference signal, and to generate a binary output based on the comparison. The digital integrated circuit may comprise a field programmable gate array. The predetermined threshold reference signal may be programmable and adjustable.

Another embodiment provides a circuit breaker comprising a monitor to detect an amount and duration of power applied to an electrical load, and generate an analog signal based on the detected amount and duration of power; an analog-to-digital converter to convert the analog signal to a digital signal; and a field programmable gate array operatively connected to the analog-to-digital converter to compare the digital signal with a threshold signal, and generate a command signal to control the amount of power applied to an electrical load based on the comparison of the digital signal with the threshold signal. The field programmable gate array may comprise a digital register to receive the digital signal from the analog-to-digital converter; and a command decoder comprising logic instructions to set a threshold power level for the electrical load, and generate an adjustable threshold reference signal based on the threshold power level.

The circuit breaker may comprise a digital comparator to compare the digital signal from the digital register with the adjustable threshold reference signal, and generate a comparison signal based on whether the digital signal exceeds the adjustable threshold reference signal. The circuit breaker may comprise a clock module to set a threshold timing level during which the electrical load can withstand an amount of power that exceeds the threshold power level, compare a duration of the power applied to the electrical load, and generate a timing signal when the duration of power applied to the electrical load above the threshold power level exceeds the threshold timing level. The circuit breaker may comprise a digital latch to set a command based on the comparison signal and the timing signal. The circuit breaker may comprise a digital command module to issue the command signal. The circuit breaker may comprise a switch to receive the command signal from the field programmable gate array, and control the amount of power applied to the electrical load.

Another embodiment provides a method of controlling electrical activity, the method comprising detecting a performance of electrical activity applied to an electrical load in an electrical circuit; creating a digital signal based on the detected performance of electrical activity; comparing the digital signal with a predetermined threshold reference signal in a digital integrated circuit; and generating a command signal to control the electrical activity applied to the electrical load when a level of the digital signal exceeds the predetermined threshold reference signal.

The electrical activity applied to the electrical load may be fixed or variable. The method may further comprise adjusting the predetermined threshold reference signal based on the electrical activity. The predetermined threshold reference signal may comprise a signal level threshold. The predetermined threshold reference signal may comprise a time threshold. The electrical activity may comprise any of a current level, voltage level, and power level applied to the electrical load.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is a block diagram illustrating the digital integrated circuit of the digital-based circuit breaker of FIG. 1 and a communicatively linked control system, according to an embodiment herein;

FIG. 5 is a block diagram illustrating the digital integrated circuit of the digital-based circuit breaker of FIG. 1 configured as a field programmable gate array, according to an embodiment herein;

FIG. 6 is a block diagram illustrating another example of a digital-based circuit breaker, according to an embodiment herein;

FIG. 7 is a block diagram illustrating the field programmable gate array of the digital-based circuit breaker of FIG. 6, according to an embodiment herein;

FIG. 8 is a block diagram illustrating another example of the field programmable gate array of the digital-based circuit breaker of FIG. 6 with a digital comparator, according to an embodiment herein;

DETAILED DESCRIPTION

Figure 1:
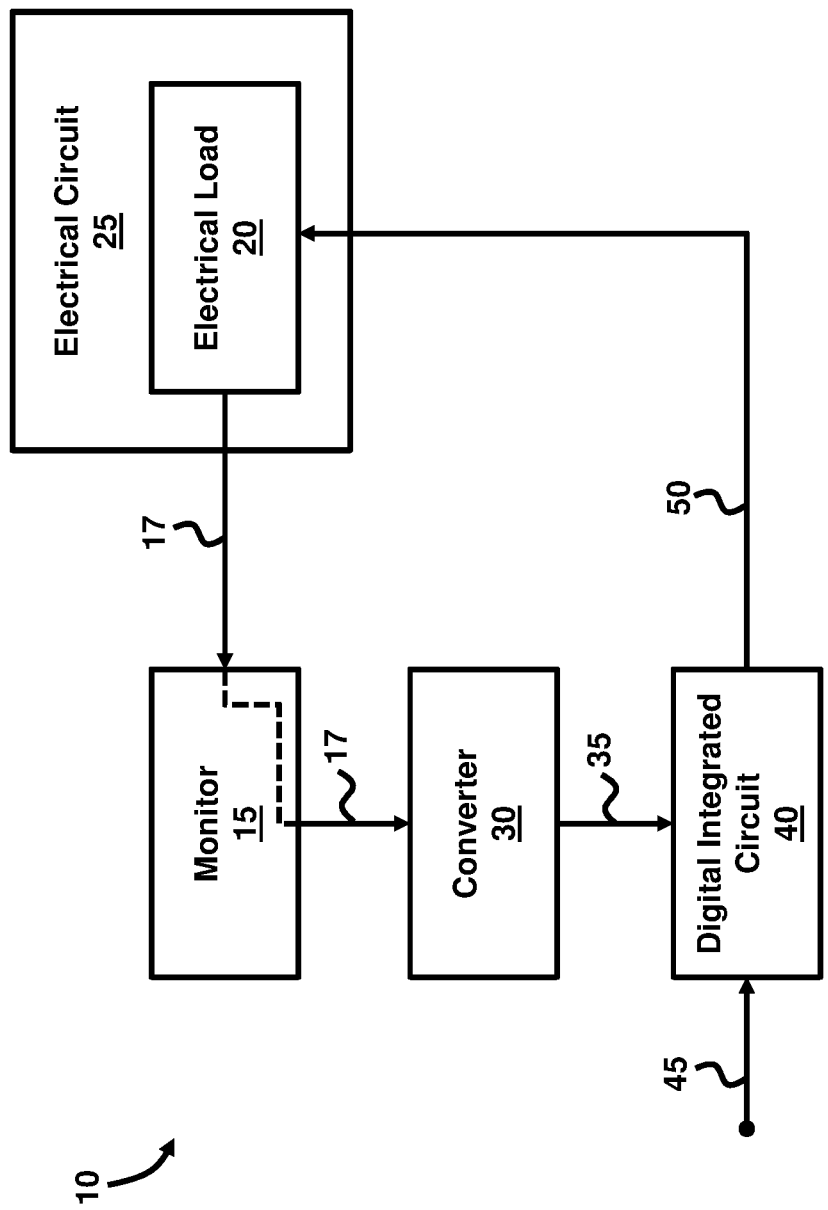
FIG. 1 is a block diagram illustrating a digital-based circuit breaker, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein provides a digital circuit breaker that replaces the functionality of an analog circuit breaker by utilizing digital electronics to compare the electrical activity (e.g., current, voltage, power, etc.) being applied in an electrical circuit (i.e., the electrical load) to a predetermined adjustable reference signal. The digital electronics is implemented in a field programmable gate array (FPGA) that comprises the predetermined reference signal. When the detected current, voltage, power, etc. exceeds the predetermined reference signal, the FPGA controls a switch, such a transistor, to break the flow of current, voltage, power, etc. in the electrical circuit. Referring now to the drawings, and more particularly to FIGS. 1 through 15B, where similar reference characters denote corresponding features consistently throughout the figures, there are shown exemplary embodiments.

FIG. 1 is a block diagram illustrating a circuit breaker 10 comprising a monitor 15 to detect a performance 17 of an electrical load 20 in an electrical circuit 25. As used herein, in one example, the electrical load 20 may be any type of electrical device operatively connected to an electrical signal source. In another example, the electrical load 20 may be any type of electrical component or a part of the electrical circuit 25 consuming power. The performance 17 may include an electrical performance 17 of the electrical load 20 such as the current that is consumed, voltage or power applied, etc. Examples of different modes associated with the electrical load 20 are fixed loads, adjustable loads, and variable loads. In a fixed load mode, the electrical load 20 may be configured in a single operating mode, and the current used is constant. An example may be a light bulb. In an adjustable load mode, the electrical load 20 may be configured in multiple operating modes, and the current used is constant in each operating mode. An example may be a hair dryer with low and high settings. In a variable load mode, the electrical load 20 may be configured in thousands of modes, whereby the current used is constant in each operating mode, and the mode that is selected is highly variable. An example may be a motor or a robotic arm.

The monitor 15 may be configured as any suitable mechanism capable of measuring the electrical performance 17 of the electrical load 20. For example, if the electrical performance 17 is the current being used by the electrical load 20, then the monitor 15 may be a current monitor, sensor, or an ammeter, etc. In an example, the monitor 15 generally detects the electrical performance 17 as an analog signal.

A converter 30 is provided to create a digital signal 35 based on the detected performance 17 of the electrical load 20. In an example, the converter 30 may be configured as an analog-to-digital converter 30 that takes the analog form (e.g., a signal) of the detected performance 17 of the electrical load 20 and converts it to the digital signal 35. As such, the digital signal 35 is the digital equivalent to the analog form of the detected performance 17 of the electrical load 20. According to an example, the converter 30 performs this function periodically, which creates a quantized reading of the analog value of the detected performance 17 over time. Each value, one sample at a time, is then transmitted into a digital integrated circuit 40, which is provided to compare the digital signal 35 with a predetermined threshold reference signal 45. As such, according to an example, the predetermined threshold reference signal 45, which is also in a digital form, is uploaded/stored in the digital integrated circuit 40 for comparison to the digital signal 35.

In some examples, the predetermined threshold reference signal 45 may be set a preprogrammed default level or may be adjusted based on logic instruction programmed into the digital integrated circuit 40; e.g., provided by software instructions, etc. Furthermore, the predetermined threshold reference signal 45 can be fixed or modified to react to the measurements detected by the monitor 15 depending on what the capabilities of the electrical load 20 may need. Furthermore, the digital integrated circuit 40 is configured to generate a command signal 50 to electrically disconnect the electrical load 20 from the electrical circuit 25 when a level of the digital signal 35 exceeds the predetermined threshold reference signal 45. In this regard, when the digital signal 35 is not within the range/level established by the predetermined threshold reference signal 45, the digital integrated circuit 40 triggers and transmits a command signal 50 to the electrical circuit 25 to electrically disconnect the electrical load 20 (i.e., breaks the circuit 25), which protects the electrical load 20 from experiencing functionally dangerous performance 17.

The circuit breaker 10 includes three functional areas: measurement, comparison, and control. The measurement function is performed by the monitor 15 to measure and define the unit (e.g., current being used, voltage applied, power applied, etc.) in which the circuit breaker 10 is to protect. The comparison function is performed by the digital integrated circuit 40 in which the measured value provided by the monitor 15 is compared to a threshold; e.g., the predetermined threshold reference signal 45. The control function, which is directed by the command signal 50, receives the result of the comparison performed by the digital integrated circuit 40, and acts upon it. Moreover, a switch element (not shown in FIG. 1), may open the current pathway, for example, in the electrical circuit 25. Accordingly, the embodiments herein perform the comparison function using digital logic; i.e., by way of the digital integrated circuit 40, which allows the circuit breaker 10 to become modular, variable, adjustable, and modifiable in addition to being able to provide for finer comparison control compared with conventional circuit breakers.

The comparison function comprises two aspects: magnitude check and duration check. For example, the magnitude check may determine whether the detected performance 17 of the electrical load 20 via the digital signal 35 is over predetermined threshold reference signal 45. The duration check, for example, may determine whether the event associated with the detected performance 17 is real and is it transient (e.g., a momentary burst of energy applied to the electrical load 20). Successful performance of the comparison function requires both aspects to be considered, analyzed, and operable.

Figure 2:
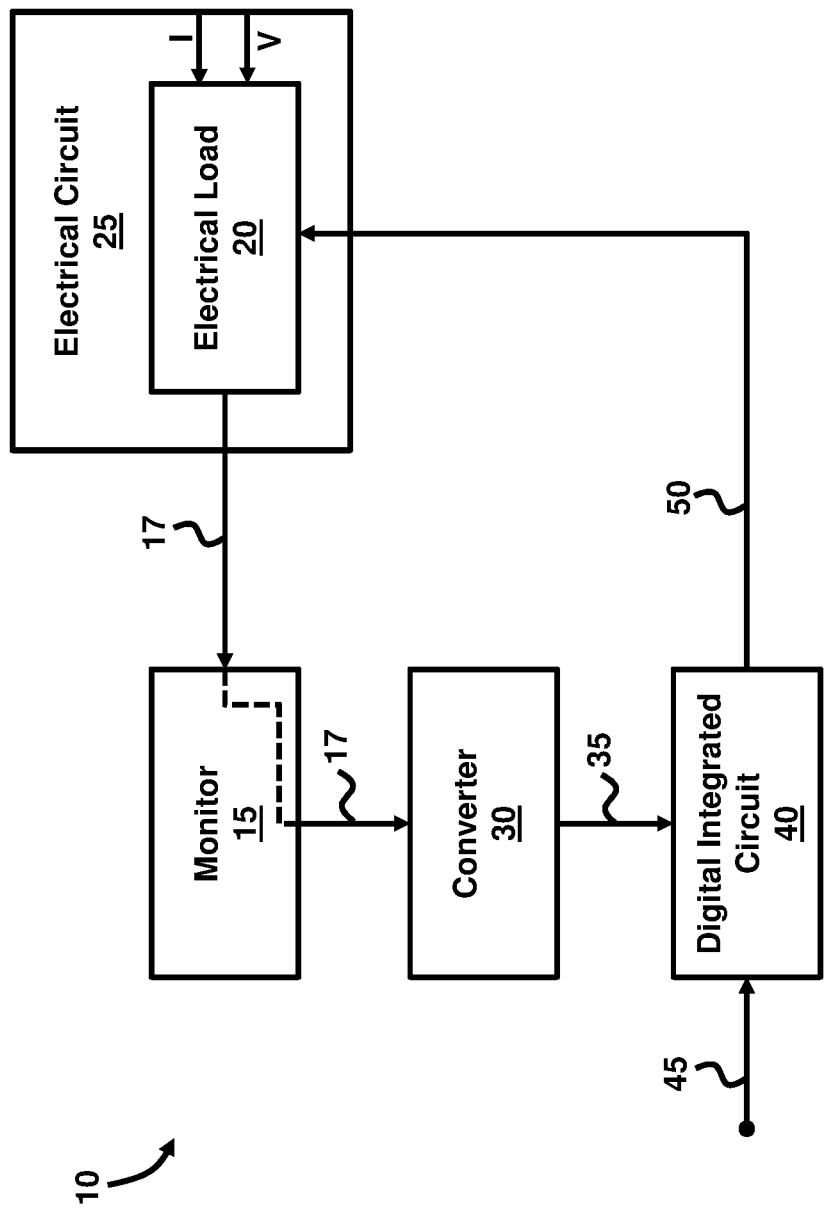
FIG. 2 is a block diagram illustrating the digital-based circuit breaker of FIG. 1 with current or voltage being applied to an electrical load, according to an embodiment herein.

As shown in FIG. 2, with reference to FIG. 1, the electrical load 20 may be configured to receive a fixed or variable amount of current (I) or voltage (V). Accordingly, the performance 17 may be related to the detected current or voltage associated with the electrical load 20. The programmable predetermined threshold reference signal 45 is able to be selected based on the multiple modes associated with the electrical load 20; e.g., the fixed or variable amount of current or voltage.

Figure 3:
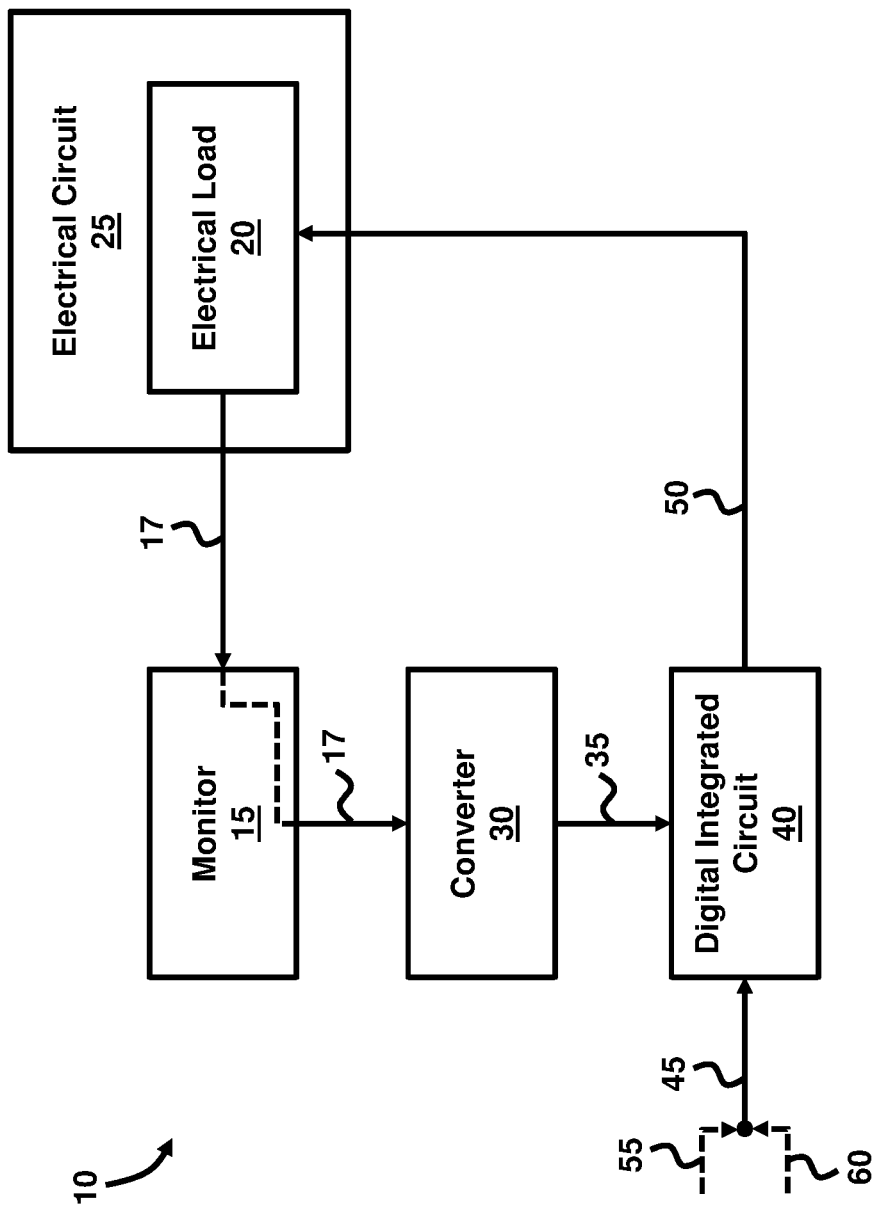
FIG. 3 is a block diagram illustrating the digital-based circuit breaker of FIG. 1 with a signal level threshold and a time threshold, according to an embodiment herein.

As shown in FIG. 3, with reference to FIGS. 1 and 2, the predetermined threshold reference signal 45 may comprise a signal level threshold 55 and a time threshold 60. The signal level threshold 55 may be used to compare to the magnitude of digital signal 35. For example, the performance 17 may relate to the amount of current consumed by the electrical load 20 and detected by the monitor 15, and the signal level threshold 55 is used as a means of comparison to this amount of detected current. The time threshold 60 may be used to compare the duration of a particular performance 17 applied to or experienced by the electrical load 20. For example, the electrical load 20 may be configured to withstand a particular threshold amount/level of power, but if the amount of power applied to the electrical load 20 exceeds this threshold level, then the electrical load 20 may not necessarily be deleteriously affected if the applied power occurs only for a short period of time. As such, the time threshold 60 may refer to the amount of time that the electrical load 20 may withstand a power surge, for example. In another example, the electrical load 20 may experience degradation of electrical performance or capabilities due to a mechanical breakdown of the components of the electrical load 20 if it experiences electrical activity, such as current, voltage, or power, etc. consumed by and/or applied to the electrical load 20, at or above a specified level for a specified duration of time. In this regard, the specified level may or may not necessarily be above the maximum threshold amount/level associated with the electrical activity; e.g., current, voltage, or power, etc. Accordingly, the predetermined threshold reference signal 45 may comprise a combination of both the signal level threshold 55 and a time threshold 60 in order to perform the comparison of the detected performance 17 of the electrical load 20 via the digital signal 35.

The selection of the value of the predetermined threshold reference signal 45 is carefully selected, and in particular, the signal level threshold 55 and a time threshold 60. For example, if the value of the signal level threshold 55 is too high, then this offers limited protection for the electrical load 20. If the value of the signal level threshold 55 is too low, then the electrical circuit 25 will suffer from seemingly constant trips. If the value of the time threshold 60 is too short, then the electrical circuit 25 will trip on transients. If the value of the time threshold 60 is too long, then this offers little protection for the electrical load 20.

In an example, the digital integrated circuit 40 may generate the command signal 50 when the level of the digital signal 35 exceeds the signal level threshold 55 and the detected performance 17 (e.g., via the digital signal 35) of the electrical load 20 exceeds the time threshold 60. As such, when the monitor 15 measures the performance 17 of the electrical load 20, the detected performance 17 includes the amount/magnitude of the current, voltage, power, etc. applied to the electrical load 20, the duration that the current, voltage, power, etc. is applied to the electrical load 20, and the duration that the current, voltage, power, etc. is applied to the electrical load 20 at specified levels of the current, voltage, power, etc.

As shown in FIG. 4, with reference to FIGS. 1 through 3, the digital integrated circuit 40 may comprise a digital register 65 to store the digital signal 35. In an example, the digital register 65 may comprise logic circuitry (not shown) such as digital flip-flop devices or latches, where each digital flip-flop or latch is configured to store one bit of data. Accordingly, the digital signal 35 is stored in the digital register 65 as bits of data. According to some examples, the digital register 65 may be configured as a shift register, a parallel in-serial out (PISO) register, cyclic register, or a counter.

As further illustrated in FIG. 4, the digital integrated circuit 40 may comprise a command decoder 70 comprising logic instructions 75 to set a threshold performance level 80 for the electrical circuit 25, and generate an adjustable threshold reference signal 85 based on the threshold performance level 80 of the electrical circuit 25. In an example, the command decoder 70 may comprise a digital circuit that is communicatively linked to a control system 5 to exchange telemetry and command (T&C) signals therebetween. For example, the circuit breaker 10 may be positioned on a satellite or spacecraft, and the command decoder 70 serves as the communicative link for the circuit breaker 10 to a ground control system 5. The command decoder 70 may transmit various parameters associated with the electrical load 20 or other aspects of the overall satellite or spacecraft, for example, including the status, configuration, and functioning of the electrical load 20. In some examples, the command decoder 70 may be configured as a processor, microprocessor, controller, microcontroller, or any other suitable hardware-enabled device, which may be programmed with the logic instructions 75. As such, the logic instructions 75 may be preprogrammed into the command decoder 70, or may transmitted through telemetry means to the command decoder 70 in real time based on the detected performance 17 of the electrical load 20.

The threshold performance level 80 may be the quantitative or qualitative factors that are used as a basis for the comparison with the detected performance of the electrical load 20 via the digital signal 35. The digital manifestation of the threshold performance level 80 is the predetermined threshold reference signal 45, which may be provided by the command decoder 70 or may be provided by a control system 5 based on the threshold performance level 80, which also may be provided by the control system 5. However, the command decoder 70 provides the mechanism for the circuit breaker 10 to store the threshold performance level 80. In an example, the predetermined threshold reference signal 45 may be the adjustable threshold reference signal 85. However, in another example, the predetermined threshold reference signal 45 may be fixed and may be a separate signal from the adjustable threshold reference signal 85. The adjustable threshold reference signal 85 is particularly helpful when the electrical load 20 is experiencing a variable amount of current, voltage, or power, etc. According to an embodiment herein, the adjustable threshold reference signal 85 may comprise the predetermined threshold reference signal 45. As such, the predetermined threshold reference signal 45 may be programmable and adjustable, and if it is adjustable, then the predetermined threshold reference signal 45 is the adjustable threshold reference signal 85.

Additionally, as shown in FIG. 4, the digital integrated circuit 40 comprises a digital comparator 90 to compare the digital signal 35 from the digital register 65 with the adjustable threshold reference signal 85, and to generate a binary output 93 based on the comparison. In an example, the digital comparator 90 comprises a digital hardware-enable device that receives two inputs as binary digits, compares the digits to one another, and outputs one of the digits according to a preprogrammed determination. For example, the digital comparator 90 may be configured to select the larger digit for output. In another example, the digital comparator 90 may be configured to select the smaller digit for output. An example of the digital comparator 90 may be a XNOR gate. The digital register 65 inputs the digital signal 35 into the digital comparator 90 as a binary digit. Similarly, the command decoder 70 inputs the adjustable threshold reference signal 85, which may be the predetermined threshold reference signal 45, into the digital comparator 90 as a binary digit. Accordingly, the digital comparator 90 compares the binary value of the digital signal 35 with the binary value of the adjustable threshold reference signal 85 (or predetermined threshold reference signal 45), and generates the binary output 93 based on the comparison. Again, the binary output 93 is not necessarily the higher of the two values, as it depends on how the digital comparator 90 is programmed; e.g., whether to select the higher of two values, or select the lower of two values.

The digital integrated circuit 40 is configured to perform a sample-by-sample comparison of the digital predetermined threshold reference signal 45 to the digital signal 35 to determine whether the digital signal 35 is within the range or threshold level established by the predetermined threshold reference signal 45. If the sample data is within the range, the sample data is either transmitted by the command decoder 70 to a communicatively linked control system 5 or may be deleted/discarded if it in not needed for further analysis or processing. If the sample data is out of range, then a data flag is set, and a timing function is initiated to determine if the "bad" value is a true problem over time or a one-off blip that can be safely ignored. The duration in the failure mode is used to determine the difference between a real event upon the electrical load 20 and an ignorable, temporary condition. The computation of time can be performed by the digital integrated circuit 40 based on the current amount of sample data with an adjustable time based on the current or a fixed sample quantity of bad data points in a row. Either process can be programmed into the digital integrated circuit 40 to implement and can be adjusted by the external control system 5 through the command decoder 70, for example. If the next reading returns to normal, no action is taken and the "bad" data flag is reset. The digital integrated circuit 40 can keep track of the quantity of blips in the digital register 65 also. Once the circuit breaker 10 determines that the time period has been sufficient long to constitute a true problem for the electrical load 20, the circuit breaker 10 latches a command bit to turn off the command signal 50. In an example, the command signal 50 may remain in a reset mode until further triggered by the digital integrated circuit 40 or by an external reset. Moreover, the digital integrated circuit 40 may also contain a bypass function to allow the comparison function to be disabled if desired based on external factors or user preference, for example.

As shown in FIG. 5, with reference to FIGS. 1 through 4, the digital integrated circuit 40 may comprise a field programmable gate array 95. According to some examples, the various components of the field programmable gate array 95; e.g., the digital register 65, command decoder 70, and digital comparator 90 may be configured as programmable logic blocks linked by programmable interconnections to perform combinational functions in accordance with the descriptions above.

Since the circuit breaker 10 is configured with digital components, such as provided by the field programmable gate array 95, the circuit breaker 10 is modifiable and customized to serve various applications and requirements. For example, the circuit breaker 10 may be used to create a 1-amp or 10-amp current breaker, without changing the digital components of the circuit breaker 10. However, other protection levels are also possible in accordance with the embodiments herein. Moreover, multiple circuit breakers 10 may be configured for the same device/application using a single field programmable gate array 95.

The circuit breaker 10 overcomes the limitations of conventional circuit breaker designs in which "nuisance trips" occur whereby a short duration transient signals trips the circuit breaker off prematurely. The field programmable gate array 95 is configured to detect, track, and ignore transient signals without creating excessively long timing durations. Furthermore, the speed of detection can be greatly improved as the faults are more easily discerned from transients. In conventional circuit breaker design the failure currents are not necessarily constant, whereby the failure may start at a high current level and reduce to a lower current level. Conversely, the current breaker 10 utilizes the field programmable gate array 95 to detect this failure condition, track it, and trip appropriately. A new command with a new the predetermined threshold reference signal 45 quickly updates the circuit breaker 10, or a new command with a longer or shorter duration window can be sent to the field programmable gate array 95 for updating, and which may occur in real time.

Another embodiment is shown in the block diagram of FIG. 6, with reference to FIGS. 1 through 5. A circuit breaker 100 is provided comprising a monitor 115 to detect an amount and duration of power 117 applied to an electrical load 120. In an example, the monitor 115 may be similarly configured and/or have similar functionality as the monitor 15 described above with respect to circuit breaker 10. In the example of FIG. 6, the electrical load 120 is configured to have power applied thereto. The monitor 115 is configured to generate an analog signal 126 based on the detected amount (e.g., magnitude) and duration (e.g., time) of power 117 applied to the electrical load 120.

The circuit breaker 100 comprises an analog-to-digital converter 130 to convert the analog signal 126 to a digital signal 135. In an example, the analog-to-digital converter 130 may be similarly configured and/or have similar functionality as the converter 30 described above with respect to circuit breaker 10. A field programmable gate array 195 is operatively connected to the analog-to-digital converter 130 to compare the digital signal 135 with a threshold signal 145, and generate a command signal 150 to control the amount of power applied to an electrical load 120 based on the comparison of the digital signal 135 with the threshold signal 145. Moreover, the field programmable gate array 195 may be similarly configured and/or have similar functionality as the digital integrated circuit 40 and/or field programmable gate array 95 described above with respect to circuit breaker 10, according to an example.

Accordingly, the circuit breaker 100 can be configured as a power breaker if the load current varies normally due to an input voltage change, which may happen in battery-powered systems. This can be performed by making a threshold level or signal 145 dependent on voltage, using the analog-to-digital converter 130 taking the source voltage and converting it for use in the field programmable gate array 195. The logic for this functionality may be enabled or disabled by command to retain modularity of the circuit breaker 100.

As shown in FIG. 7, with reference to FIGS. 1 through 6, the field programmable gate array 195 may comprise a digital register 165 to receive the digital signal 135 from the analog-to-digital converter 130. In an example, the digital register 165 may be similarly configured and/or have similar functionality as the digital register 65 described above with respect to circuit breaker 10. The field programmable gate array 195 may further comprise a command decoder 170 operatively connected to the digital register 165 and comprising logic instructions 175 to set a threshold power level 180 for the electrical load 120, and generate an adjustable threshold reference signal 185 based on the threshold power level 180. In some examples, the command decoder 170 may be similarly configured and/or have similar functionality as the command decoder 70 described above with respect to circuit breaker 10, and the corresponding configurations and/or functionalities of the threshold signal 145, logic instructions 175, threshold power level 180, and adjustable threshold reference signal 185, respectively, may be similarly configured and/or have similar functionalities as the corresponding predetermined threshold reference signal 45, logic instructions 75, threshold performance level 80, and adjustable threshold reference signal 85 described above with respect to circuit breaker 10.

As shown in FIG. 8, with reference to FIGS. 1 through 7, the circuit breaker 100 may comprise a digital comparator 190 to compare the digital signal 135 from the digital register 165 with the adjustable threshold reference signal 185, and generate a comparison signal 193 based on whether the digital signal 135 exceeds the adjustable threshold reference signal 185. As such, the adjustable threshold reference signal 185 and the comparison signal 193 are both in a digital form. According to some examples, the digital comparator 190 and comparison signal 193 may be similarly configured and/or have similar functionalities as the digital comparator 90 and binary output 93, respectively, described above with respect to circuit breaker 10.

Figure 9:
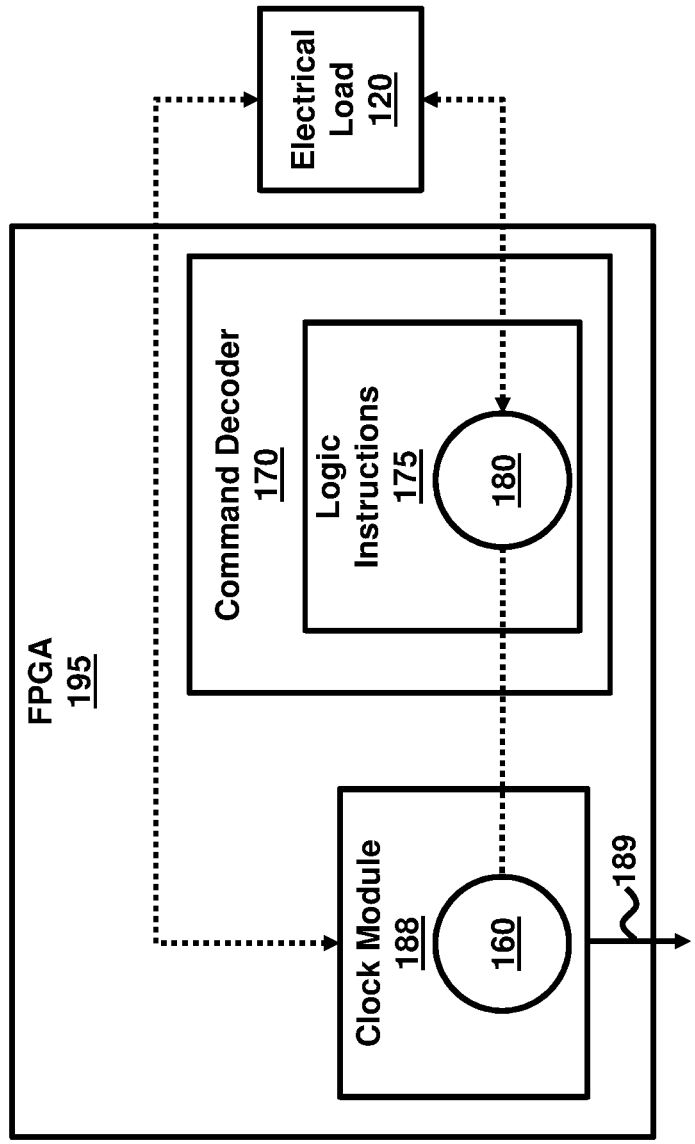
FIG. 9 is a block diagram illustrating another example of the field programmable gate array of the digital-based circuit breaker of FIG. 6 with a clock module, according to an embodiment herein.

As shown in FIG. 9, with reference to FIGS. 1 through 8, the circuit breaker 100 may comprise a clock module 188 to set a threshold timing level 160 during which the electrical load 120 can withstand an amount of power that exceeds the threshold power level 180, compare a duration of the power applied to the electrical load 120, and generate a timing signal 189 when the duration of power applied to the electrical load 120 above the threshold power level 180 exceeds the threshold timing level 160. In an example, the clock module 188 may comprise a digital hardware-enabled clock signal generating device that may be a phase-locked loop (PLL) clock. The clock signal (e.g., timing signal 189) is a digital signal, according to an example. The clock module 189 may be preprogrammed with the threshold timing level 160 associated with the amount of time that the electrical load 120 is determined to be able to withstand the amount or magnitude of power that exceeds the threshold power level 180. In an example, the threshold power level 180 may be preprogrammed or may be provided in real time by the command decoder 170. Moreover, the threshold power level 180 may be fixed or variable.

Figure 10:
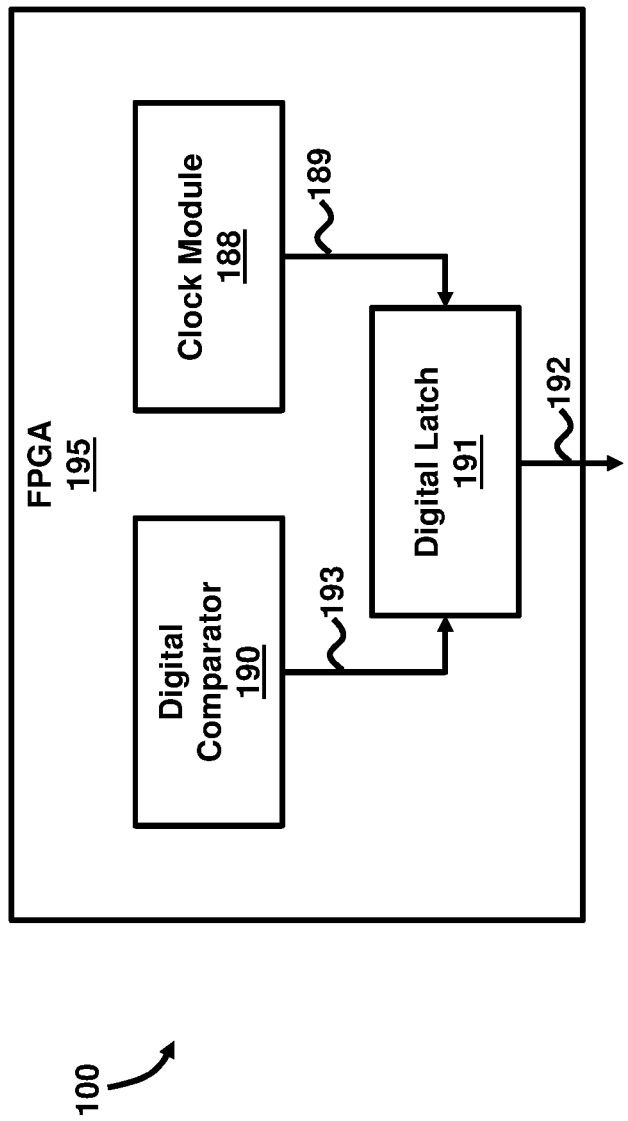
FIG. 10 is a block diagram illustrating another example of the field programmable gate array of the digital-based circuit breaker of FIG. 6 with a digital latch, according to an embodiment herein.

As shown in FIG. 10, with reference to FIGS. 1 through 9, the circuit breaker 100 may comprise a digital latch 191 to set a command 192 based on the comparison signal 193 and the timing signal 189. In examples, the digital latch 191 may be any suitable hardware-enabled logic device that may receive, as inputs, the comparison signal 193 and the timing signal 189 and determine a command 192 based on the signal processing of the signals 189, 193. The command 192 is output in the form of the command signal 150, and the digital latch 191 may be asynchronous such that the command 192, and corresponding command signal 150, may be updated whenever the comparison signal 193 and timing signal 189 change.

Figure 11:
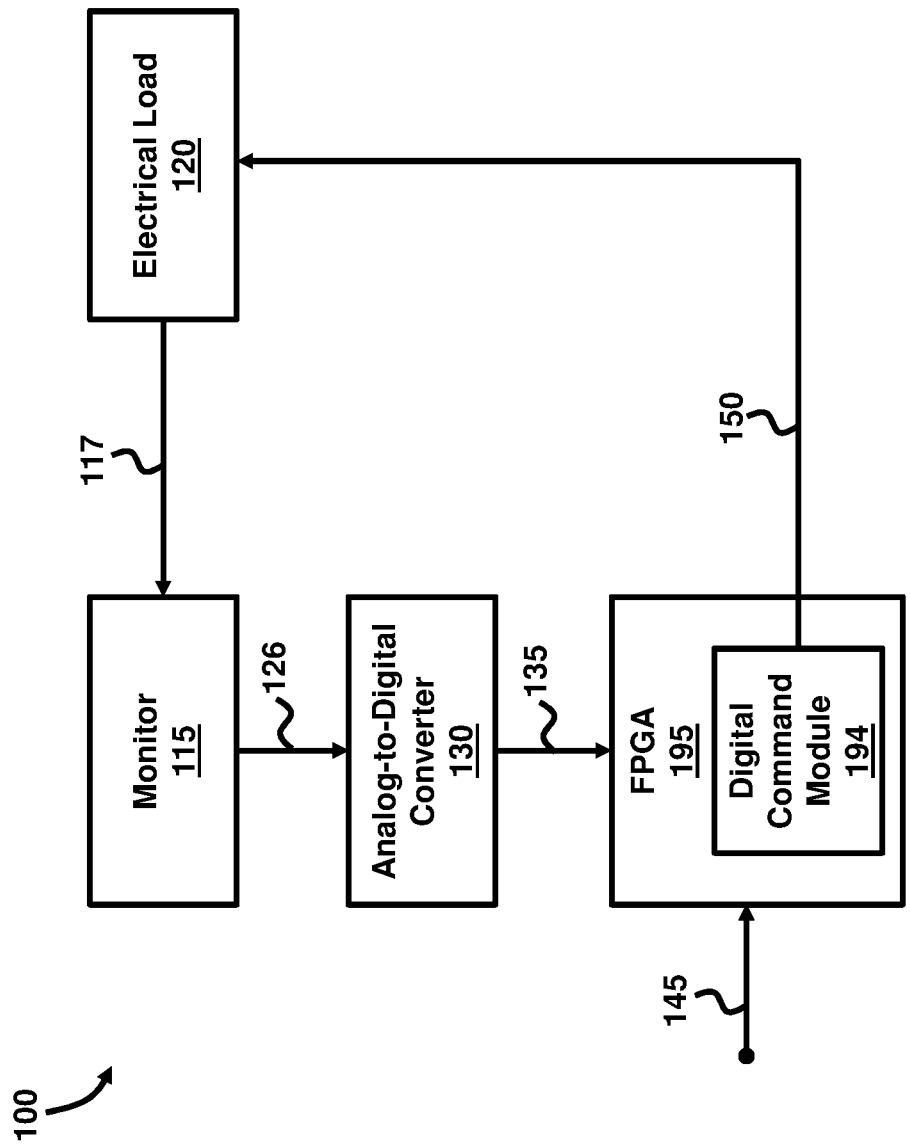
FIG. 11 is a block diagram illustrating the digital-based circuit breaker of FIG. 6 with a digital command module, according to an embodiment herein.

As shown in FIG. 11, with reference to FIGS. 1 through 10, the circuit breaker 100 may comprise a digital command module 194 to issue the command signal 150. In an example, the digital command module 194 may be a hardware-enabled logic device or driver that issues the command signal 150 to be output from the field programmable gate array 195 and to be directed to the electrical load 120 to manage the power applied to the electrical load 120. According to some examples, the digital command module 194 may be preprogrammed or may be controlled in real time by the command decoder 170 to output the command signal 150 at a specified time depending on the command 192. Additionally, the digital command module 194 may be programmed (e.g., the command 192 may be programmed) to output the command signal 150 at a specific frequency.

Figure 12:
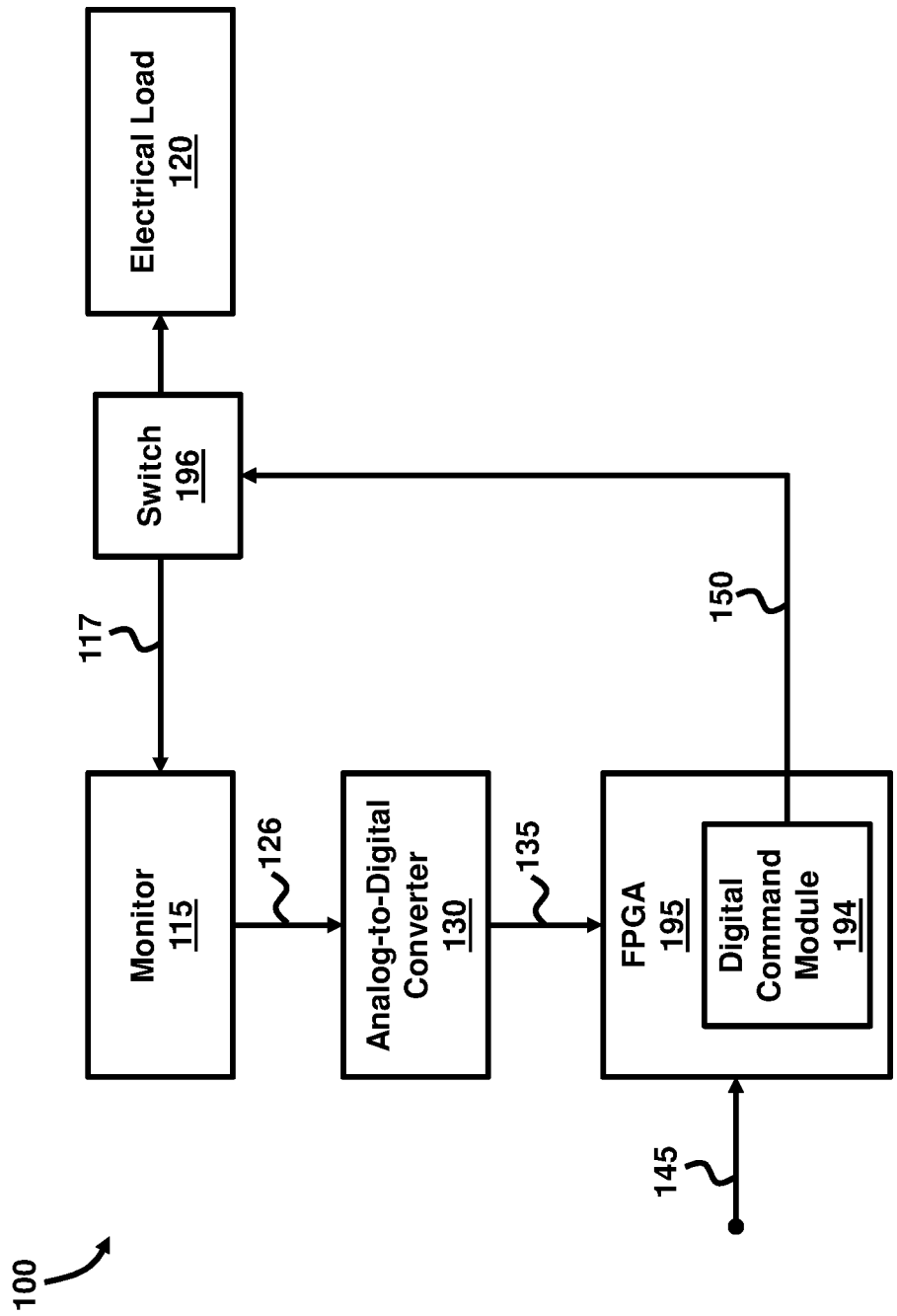
FIG. 12 is a block diagram illustrating the digital-based circuit breaker of FIG. 6 with a digital command module and switch, according to an embodiment herein.
Figure 13:
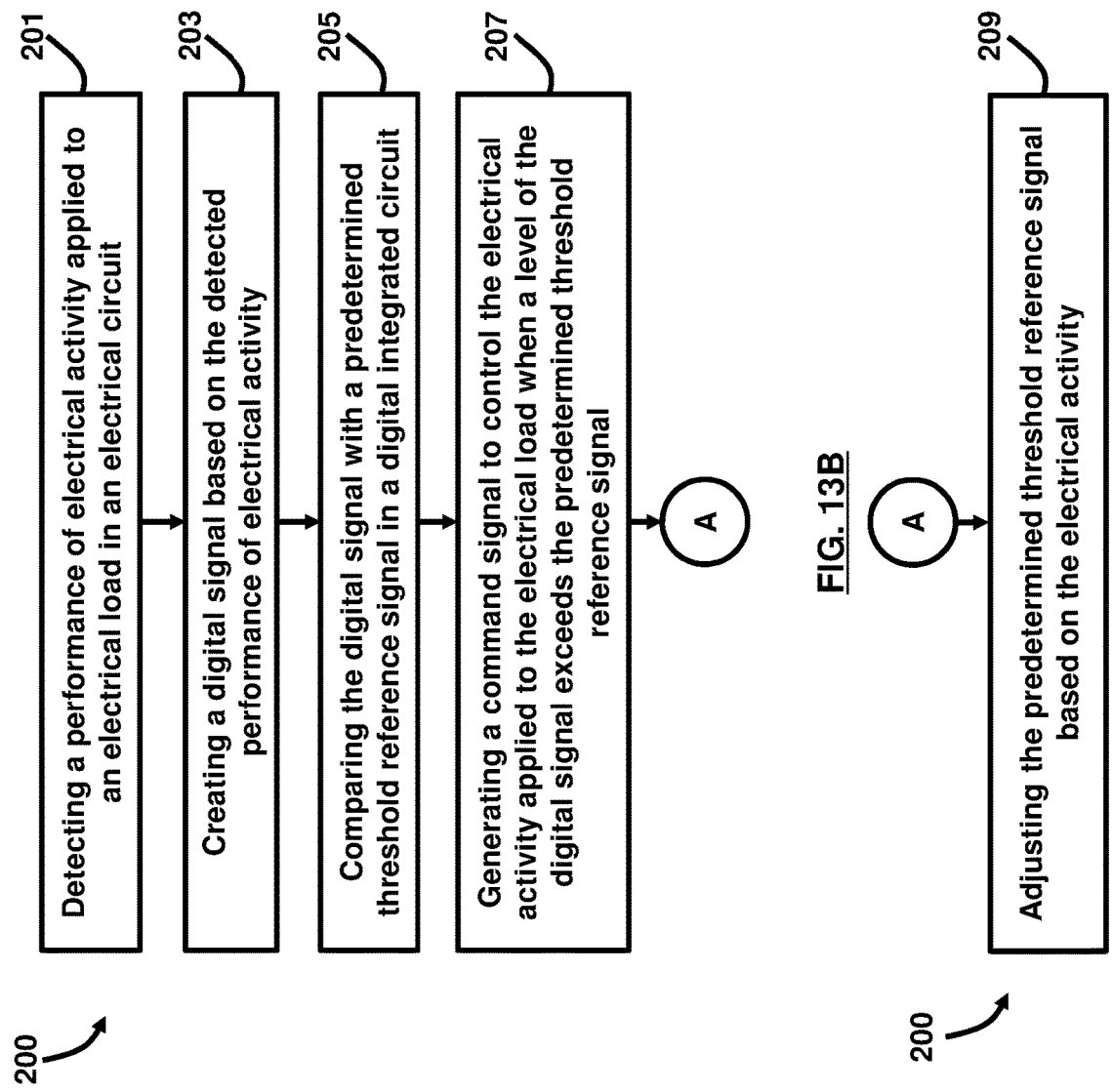
FIG. 13A is a flow diagram illustrating a method of controlling electrical activity in an electrical circuit using digital signal processing, according to an embodiment herein.
FIG. 13B is a flow diagram illustrating a method of controlling electrical activity in an electrical circuit by adjusting a threshold reference signal, according to an embodiment herein.

As shown in FIG. 12, with reference to FIGS. 1 through 11, the circuit breaker 100 may comprise a switch 196 to receive the command signal 150 from the field programmable gate array 195, and control the amount of power applied to the electrical load 120. In some examples, the switch 196 may be a transistor such as a field effect transistor (FET), metal-oxide-semiconductor field-effect transistor (MOSFET), junction field-effect transistor (JFET), as well as other types of transistor devices. As such, the switch 196 may serve as a bridge or buffer between the electrical load 120 to be monitored and the field programmable gate array 195, as well as between the electrical load 120 and the monitor 115.

The digital logic components in the field programmable gate array 95; e.g., the digital register 165, command decoder 170, clock module 188, digital comparator 190, digital latch 191, and digital command module 194, etc., allows for improved sample-by-sample protection schemes of the electrical load 120, which offers improvements over conventional circuit breakers. Furthermore, the data associated with the detection of the amount and duration of power 117 may be stored in memory (not shown) and/or downloaded through the command decoder 170 for the period of failure, which is not available in conventional circuit breakers. This information is useful for troubleshooting and understanding exactly what happened in a failure event.

FIGS. 13A and 13B, with reference to FIGS. 1 through 12, are flow diagrams illustrating a method 200 of controlling electrical activity according to an embodiment herein. As shown in FIG. 13A, the method 200 comprises detecting (201) a performance 17 of electrical activity applied to an electrical load 20 in an electrical circuit 25, creating (203) a digital signal 35 based on the detected performance 17 of electrical activity, comparing (205) the digital signal 35 with a predetermined threshold reference signal 45 in a digital integrated circuit 40, and generating (207) a command signal 50 to control the electrical activity applied to the electrical load 20 when a level of the digital signal 35 exceeds the predetermined threshold reference signal 45.

The electrical activity applied to the electrical load 20 may be fixed or variable. As shown in FIG. 13B, the method 200 may further comprise adjusting (209) the predetermined threshold reference signal 45 based on the electrical activity. In an example, the predetermined threshold reference signal 45 may comprise a signal level threshold 55. In another example, the predetermined threshold reference signal 45 may comprise a time threshold 60. The electrical activity may comprise any of a current level, voltage level, and power level applied to the electrical load 20, according to some examples. The processes (203), (205), and (209) of method 200 may be exclusively digital-based processes and may be performed using logic instructions programmed into and performed by the field programmable gate array 95, according to an example.

The circuit breakers 10, 100 provided by the embodiments herein convert the standard breaker process from an all-analog process into a substantially digital process. The circuit breakers 10, 100 may be configured to operate as stand-alone units or may be remotely programmed, and the circuit breakers 10, 100 could be configured with a small number of logic components as described above around a single, non-isolated power supply (not shown). The digital configuration provided by the circuit breakers 10, 100 is inherently less impacted by environmental issues and can produce improved performance through lower error bars around trip and persistence levels.

By utilizing digital logic; e.g., the field programmable gate array 95, 195, the circuit breakers 10, 100 allows for several features that are distinct from conventional analog-only circuit breakers. For example, the circuit breakers 10, 100 provide for adjustable over-current trip limits, adjustable persistence time limits, narrower range of limit variability having better performance with more predictable results. This also allows for tiered breakers in a cascade protection scheme where a bigger breaker feeds smaller breakers. Furthermore, the circuit breakers 10, 100 provide for variability for trip set points, and are efficiently reproducible, modular, and scalable. For example, once written, the field programmable gate array logic is set such that if another circuit breaker is needed for another application, then one may simply copy the existing logic instructions 75, 175 and use it to program another field programmable gate array for another circuit breaker. Moreover, if a different performance level has to be set, then an appropriate command may be changed, even in real time. Additionally, the circuit breakers 10, 100 provide for ease in data capture at the time of failure (e.g., an event) of the electrical load 20, 120.

Figure 14:
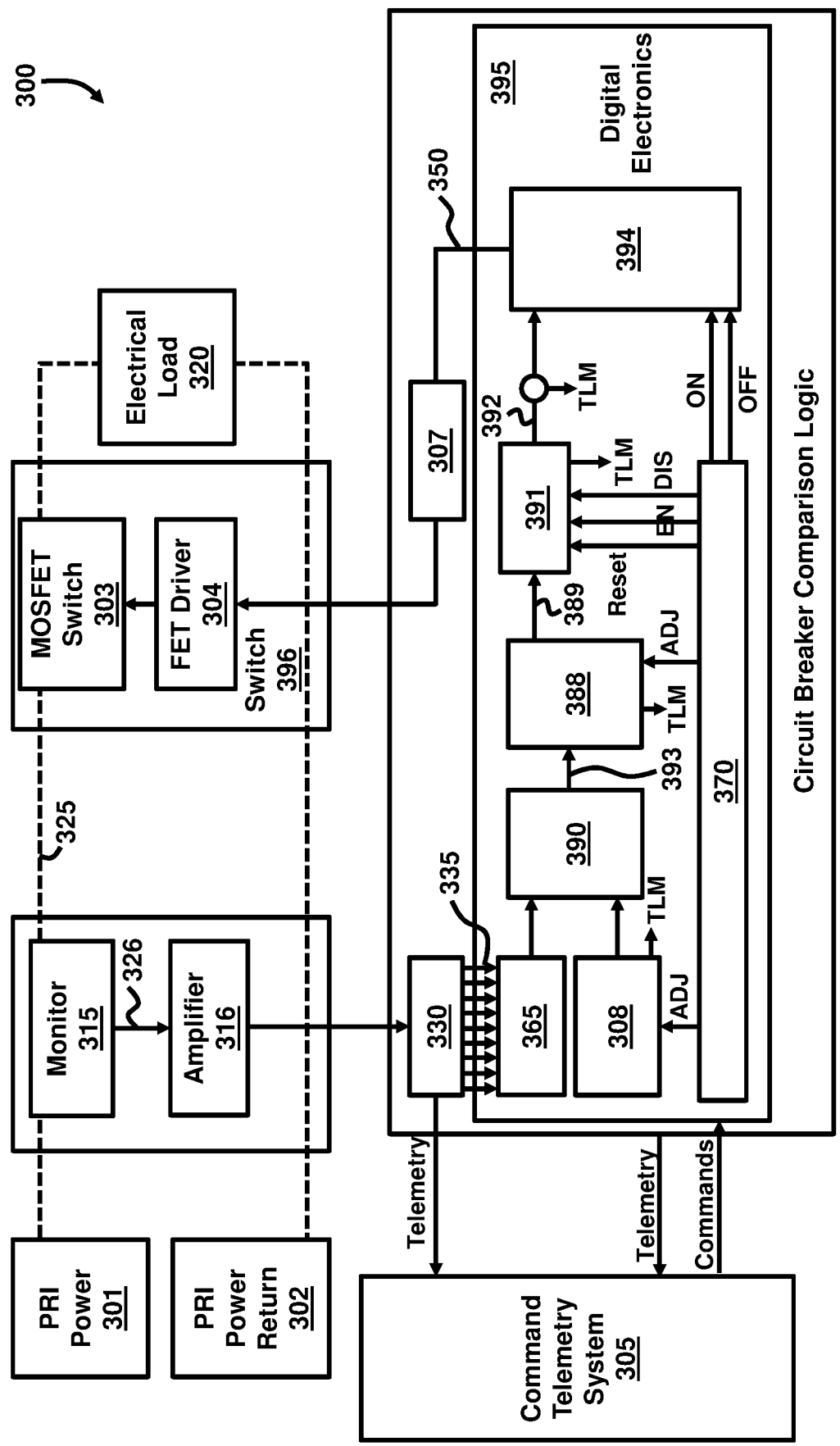
FIG. 14 is a block diagram illustrating an implementation of the digital-based circuit breakers of FIGS. 1 and 6, according to an embodiment herein.

FIG. 14, with reference to FIGS. 1 through 13B, is an example implementation of the circuit breakers 10, 100, shown in FIG. 14 as circuit breaker 300. A primary power source 301 is provided to apply power to an electrical load 320, with power returning to a primary power return 302 to complete the electrical circuit 325. A monitor 315 is provided to monitor the electrical activity (e.g., current, voltage, power, etc.) associated with the electrical load 320. An amplifier 316 amplifies the analog signal 326 associated with the detected electrical activity, and inputs the same to an analog-to-digital converter 330, which converts the analog signal 326 to a digital signal 335, and input and store the digital signal 335 into a digital register 365 as bits of data. A digital comparator 390 is provided to compare the digital signal 335 from the digital register 365 with the adjustable threshold reference signal ADJ provided by a command decoder 370 and input by a digital adjustable reference register 308. The digital comparator 390 generates a comparison signal 393 based on whether the digital signal 335 exceeds the adjustable threshold reference signal ADJ.

A digital adjustable persistence clock module 388 is provided to verify that the digital signal 335 is within a predetermined threshold timing level, which refers to the duration which the electrical load 320 can withstand an amount of power that exceeds a threshold power level set by the command decoder 370. A timing signal 389 is set by the clock module 388, and a digital latch 391 is provided to set a command 392 based on the comparison signal 393 and the timing signal 389.

A switch command driver 394 is provided to issue a command signal 350 for breaking the circuit 325. The various logic components in the field programmable gate array 395 may transmit and/or receive various adjustment signals (ADJ) and/or telemetry signals (TLM). The ADJ signals may include a threshold reference level associated with the maximum magnitude of power that the electrical load 320 can safely withstand as well as the duration of the power applied to the electrical load 320 that can safely be applied. The TLM signals may include command and/or data status signals transceived between the field programmable gate array 395 by way of the command decoder 370 and a communicatively linked command telemetry system 305. Furthermore, Reset signals may be provided by the command decoder 370 to reset the digital latch 391 at specified times and/or after the occurrence of a particular event. Additionally, enabling (EN) and disabling (DIS) signals may be provided by the command decoder 370 to the digital latch 391 to enable and/or disable operation of the digital latch 391, which may serve as an override feature to ensure the electrical load 320 is disconnected from the electrical circuit 325 when it is necessary to do so. Furthermore, the digital latch 391 may provide ON and OFF signals to control the switch command driver 394 for issuance of the command signal 350. An opto-electric device 307 may be provided to transmit the command signal 350 to the switch 396 containing a FET driver 304 for controlling a MOSFET switch 303, which in turn electrically disconnects the electrical load 320 from the electrical circuit 325.

Figure 15A:
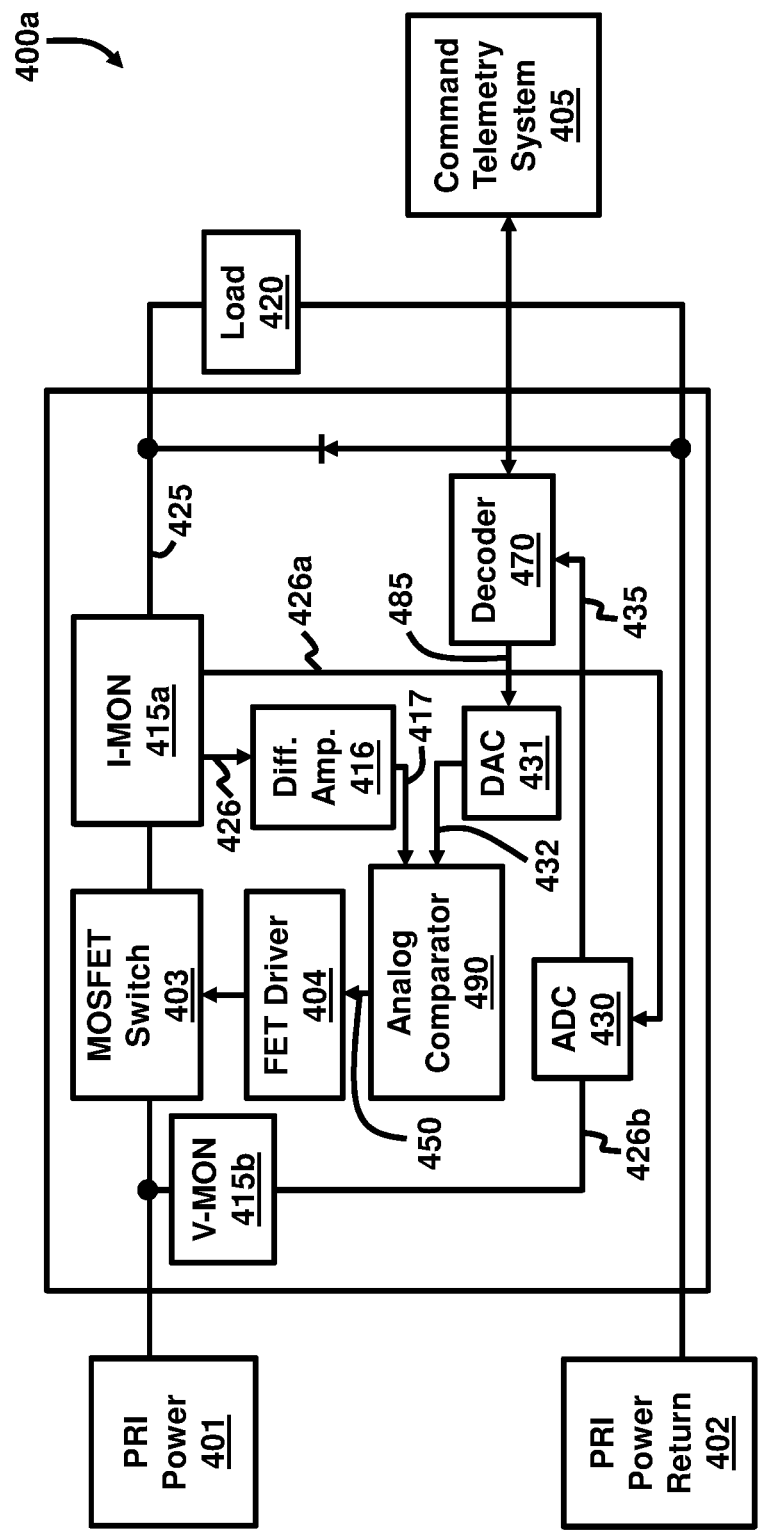
FIG. 15A is a block diagram illustrating a circuit breaker with an analog comparator, according to an embodiment herein.
Figure 15B:
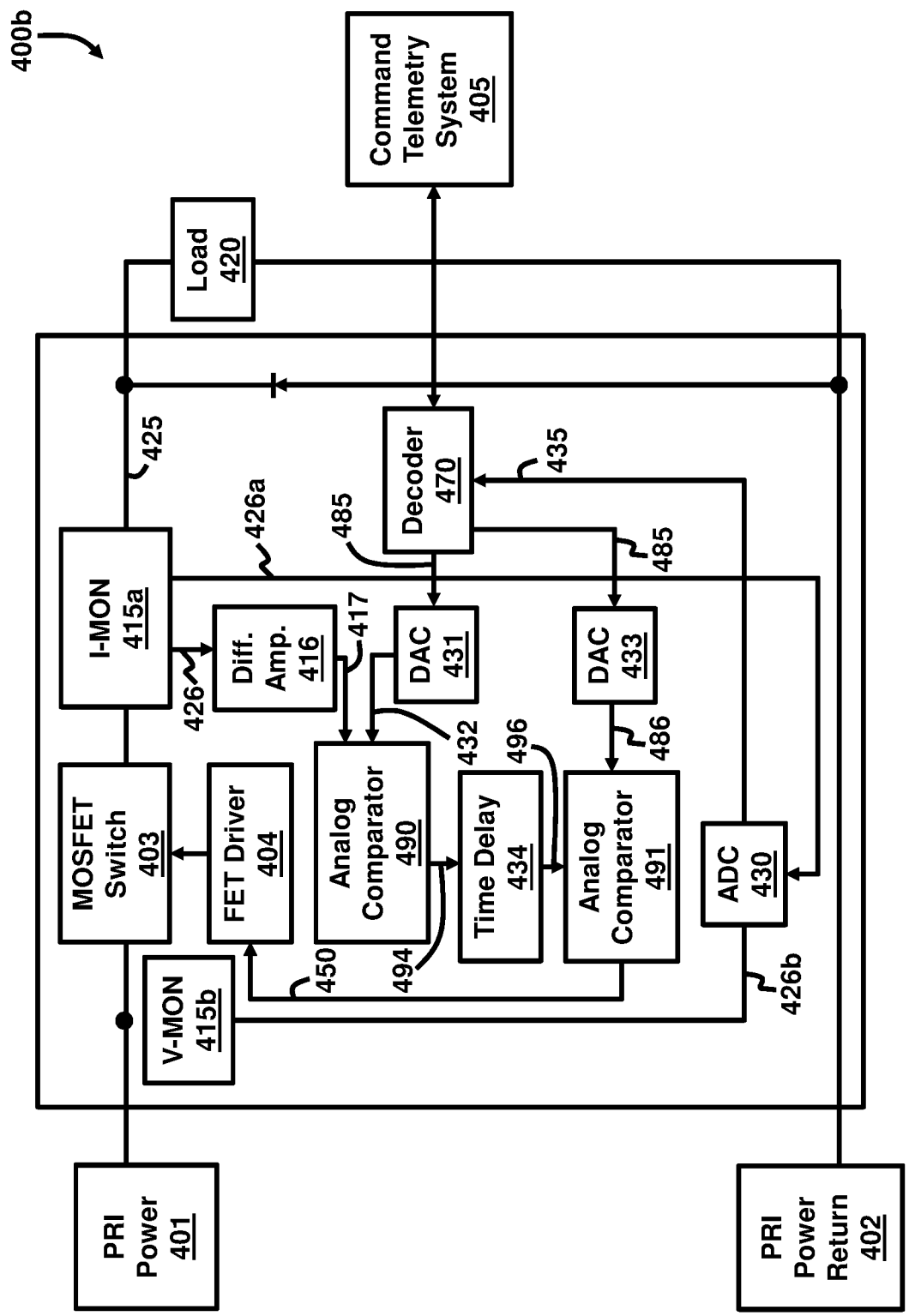
FIG. 15B is a block diagram illustrating a circuit breaker with a pair of analog comparators, according to an embodiment herein.

FIGS. 15A and 15B, with reference to FIGS. 1 through 14, are other example implementations provided by the embodiments herein. The circuit breaker 400a, 400b allows for digital control to create variable trip levels but not variable time levels. The comparison function is performed using an analog approach. The circuit breaker 400a, 400b could be used where time variability has little benefit based upon the protection needed. In this regard, an analog comparator 490 is provided with a digital-to-analog converter 431 to adjust a threshold or duration level.

A primary power source 401 is provided to apply power to an electrical load 420, with power returning to a primary power return 402 to complete the electrical circuit 425. A current monitor 415a measures the current consumed by the electrical load 420 and a voltage monitor 415b measures the voltage applied to the electrical load 420. A differential amplifier 416 amplifies the signal 426 from the current monitor 415a. The analog signals 426a, 426b from the current monitor 415a and voltage monitor 415b, respectively, are input into an analog-to-digital converter 430, with the resulting digital signal 435 input into a command decoder 470, which generates a digital adjustable threshold reference signal 485, which is input into a digital-to-analog converter 431. The analog signal 432 from the digital-to-analog converter 431 together with the analog signal 417 from the differential amplifier 416 are input into an analog comparator 490, which performs the comparison function for the circuit breaker 400. The command signal 450 from the analog comparator 490 then goes to a FET driver 404, which controls a MOSFET switch 403, which in turn electrically disconnects the electrical load 420 from the electrical circuit 425.

In circuit breaker 400a, as provided in FIG. 15A, there is one analog comparator 490 to perform the comparison function with one digital-to-analog converter 431 to adjust a threshold or duration level. In circuit breaker 400b, as provided in FIG. 15B, there are a pair of analog comparators 490, 491 to perform the comparison function with a pair of digital-to-analog converters 431, 433 to adjust a threshold or persistence level of transients upon the electrical load 420. In this regard, the first analog comparator 490 performs a time persistence comparison using a time delay approach, and the second analog comparator 491 performs the threshold comparison as described above with respect to circuit breaker 400a.

In circuit breaker 400b, the command decoder 470 inputs the digital adjustable threshold reference signal 485 into the pair of digital-to-analog converters 431, 433. The analog signal 432 from the digital-to-analog converter 431 together with the analog signal 417 from the differential amplifier 416 are input into an analog comparator 490 to perform a time persistence comparison to analyze the occurrence of a transient event upon the electrical load 420 to compare the time persistence length associated with a transient event with a persistence reference threshold, and an analog signal 494 is input into an analog time delay circuit 434 to create a phase difference between the input analog signal 494 and an output analog signal 496. Thereafter, the output analog signal 496 is transmitted to the analog comparator 491, which also receives the analog signal 486 from the digital-to-analog converter 433, and generates the command signal 450 to be input into the FED driver 404, which controls a MOSFET switch 403, which in turn electrically disconnects the electrical load 420 from the electrical circuit 425. This approach offers some time variability to provide enhanced analysis while performing the comparison function.

The embodiments herein provide techniques to perform the comparison function associated with a circuit breaker. A digital-based solution is provided in circuit breakers 10, 100, 300 to allow modularity, adjustability, and flexibility in using a single configuration of a circuit breaker for different applications by reprogramming digital electronics in the circuit breaker 10, 100 as opposed to changing an entire hardware configuration or having to provide a completely different circuit breaker with different rating parameters. A combination digital and analog approach is provided in circuit breakers 400a, 400b to provide an alternative configuration for monitoring the electrical activity in an electrical circuit 425 and removing a connection to an electrical load 420 when required to ensure integrity of the electrical load 420.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A circuit breaker comprising:
a monitor to detect a performance of an electrical load in an electrical circuit;
a converter to create a digital signal based on the detected performance of the electrical load; and
a digital integrated circuit to compare the digital signal with a predetermined threshold reference signal, and generate a command signal to electrically disconnect the electrical load from the electrical circuit when a level of the digital signal exceeds the predetermined threshold reference signal,
wherein the digital intergrated circuit includes:
a digital register to store the digital signal;
a command decoder comprising logic instructions to set a threshold performance level for the electrical circuit, and generate an adjustable threshold reference signal based on the threshold performance level; and
a digital comparator to compare the digital signal from the digital register with the adjustable threshold reference signal, and to generate a binary output based on the comparison.

2. The circuit breaker of claim 1, wherein the electrical load is configured to receive a fixed or variable amount of current or voltage.

3. The circuit breaker of claim 1, wherein the predetermined threshold reference signal comprises a signal level threshold and a time threshold.

4. The circuit breaker of claim 3, wherein the digital integrated circuit generates the command signal when the level of the digital signal exceeds the signal level threshold and the detected performance of the electrical load exceeds the time threshold.

5. The circuit breaker of claim 1, wherein the digital integrated circuit comprises a field programmable gate array.

6. The circuit breaker of claim 1, wherein the predetermined threshold reference signal is programmable and adjustable.

7. A circuit breaker comprising:
a monitor to detect an amount and duration of power applied to an electrical load, and generate an analog signal based on the detected amount and duration of power;
an analog-to-digital converter to convert the analog signal to a digital signal; and
a field programmable gate array operatively connected to the analog-to-digital converter to compare the digital signal with a threshold signal, and generate a command signal to control the amount of power applied to the electrical load based on the comparison of the digital signal with the threshold signal,
wherein the field programmable gate array includes:
a digital register to receive the digital signal from the analog-to-digital converter, and
a command decoder comprising logic instructions to set a threshold power level for the electrical load, and generate an adjustable threshold reference signal based on the threshold power level.

8. The circuit breaker of claim 7, comprising a digital comparator to compare the digital signal from the digital register with the adjustable threshold reference signal, and generate a comparison signal based on whether the digital signal exceeds the adjustable threshold reference signal.

9. The circuit breaker of claim 8, comprising a clock module to set a threshold timing level during which the electrical load can withstand an amount of power that exceeds the threshold power level, compare a duration of the power applied to the electrical load, and generate a timing signal when the duration of power applied to the electrical load above the threshold power level exceeds the threshold timing level.

10. The circuit breaker of claim 9, comprising a digital latch to set a command based on the comparison signal and the timing signal.

11. The circuit breaker of claim 7, comprising a digital command module to issue the command signal.

12. The circuit breaker of claim 7, comprising a switch to receive the command signal from the field programmable gate array, and control the amount of power applied to the electrical load.

* * * * *